Patented July 29, 1924.

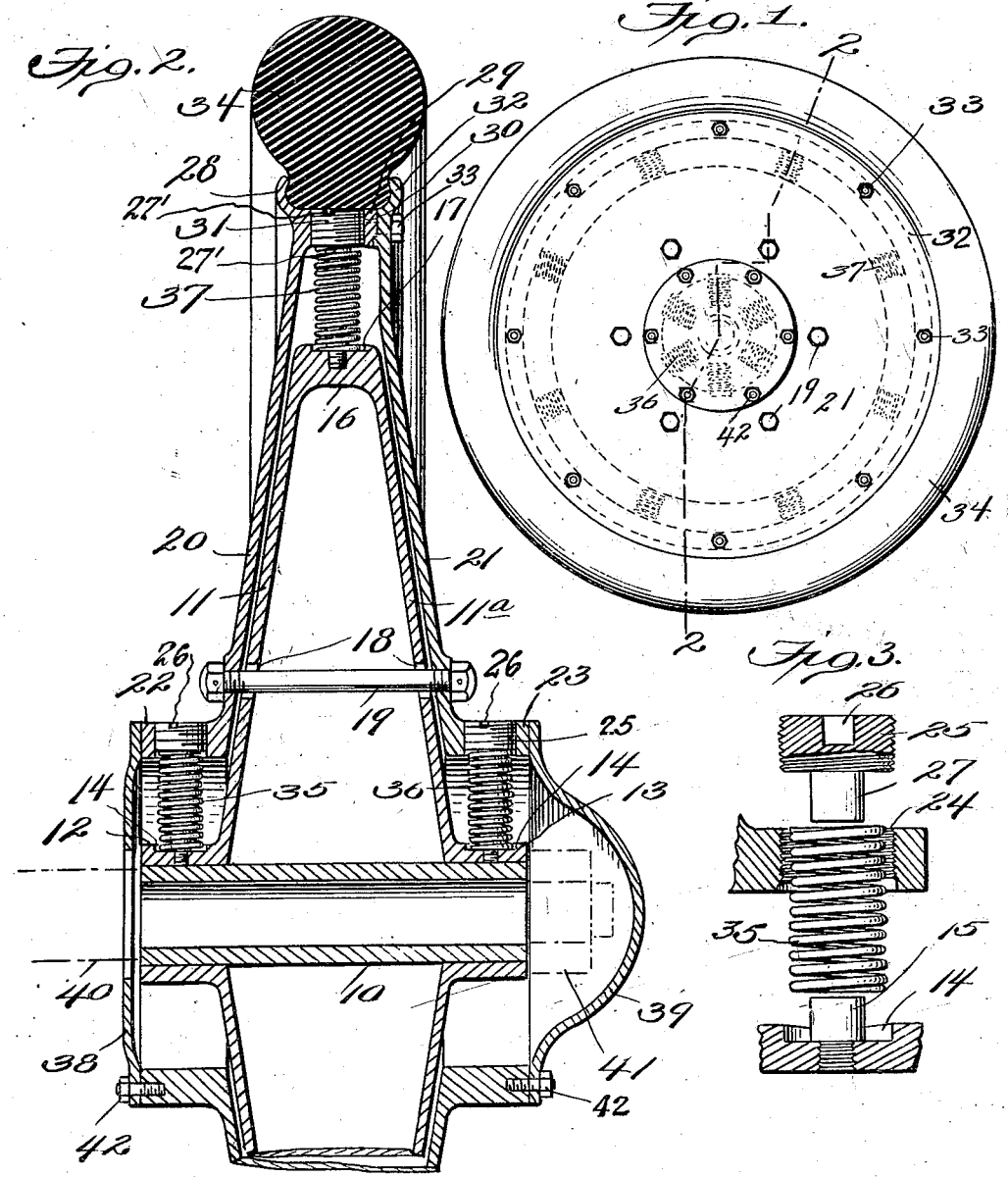

1,503,424

UNITED STATES PATENT OFFICE.

ROBERT ANSON LITTLE, OF HAZELTON, WEST VIRGINIA.

SPRING WHEEL.

Application filed October 13, 1923. Serial No. 668,381.

*To all whom it may concern:*

Be it known that I, ROBERT ANSON LITTLE, a citizen of the United States, residing at Hazelton, in the county of Preston and State of West Virginia, have invented new and useful Improvements in Spring Wheels, of which the following is a specification.

The present invention relates to wheels and particularly vehicle wheels of the disc type, and the primary object of the same is to provide a vehicle wheel on which a solid tire may be mounted and which, when provided with a solid tire, will possess the resiliency of a wheel provided with a pneumatic tire. A further object of the invention is to provide such a wheel in which the active parts are protected from dirt and from damage by weather or abuse. Still further objects are, neatness of appearance, durability, simplicity of construction, cheapness of manufacture and facility of assemblage and renewal of parts.

Referring to the drawing forming a part of the specification:

Fig. 1 is a side elevation of a wheel in accordance with the present invention, showing in dotted lines the relation of the annular rows of springs to each other;

Fig. 2 is a fragmentary sectional view of the wheel on an enlarged scale on the line 2—2, Fig. 1, showing the relation of the inner discs of the wheel to the outer discs, the relation of the springs to each other and other internal structure; and Fig. 3 is a detail view, on an enlarged scale, of one of the springs mounted between the flanges of the inner and outer discs.

Referring to the drawing in detail, 10 designates the hub of the wheel, to which the two discs 11 and 11ª are rigidly attached by brazing, sweating or any other suitable means, the discs being provided with outstanding annular flanges 12 and 13, respectively having depressions 14 formed therein, to afford seats for springs 35, 36 as hereinafter set forth, in the center of which are secured pins 15 projecting radially from the flanges. The discs coverge toward one another in the direction of the tread of the wheel and are united at their outer edges by a web 16 having depressions 17 formed therein, affording seats similar to the depressions 14 for springs 37 centrally secured therein. A series of apertures 18 is formed in each of the discs 11 and 11ª, said apertures being arranged in a circle which is concentric with the hub of the wheel, and the apertures 18 of the disc 11 are in alignment with those in the disc 11ª. A second pair of discs 20 and 21 envelop the discs 11 and 11ª and a plurality of apertures aligning with, but of smaller size than, the apertures 18 in the discs 11 and 11ª are formed in the discs 20 and 21. Bolts 19 extend through the apertures of the discs 20 and 21 and the apertures 18 of the discs 11 and 11ª. The bolts 19 closely fit the apertures in the discs 20 and 21 but are of smaller diameter than the apertures 18 of the discs 11 and 11ª to afford play of the discs 20 and 21 radially of the wheel relatively to the discs 11 and 11ª. The discs 20 and 21 are provided at their inner edges with annular flanges 22 and 23 corresponding to the flanges 12 and 13 of the discs 11 and 11ª, and the flanges 22 and 23 are provided with apertures 24 corresponding to, and adapted to aline with, the depressions 14 of the flanges 12 and 13. The apertures 24 are closed by plugs 25 threaded into the apertures 24. Each of the plugs 25 has a kerf 26 into which a tool may be inserted for tightening them in the apertures. The plugs have also stems 27, for a purpose which will presently appear. The discs 20 and 21 converge for a certain distance toward their outer edges and are adapted to lie parallel to the discs 11 and 11ª, respectively. The disc 20 is provided with a flange 28 of curved cross section and a lateral web 29 which extends toward the disc 21, said web having apertures 30 therein corresponding to, and adapted to be brought into alinement with, the depressions 17 of the web 16, said apertures 30 being closed by threaded plugs 31, similar to the plugs 25, and having stems 27' thereon. The web 29 constitutes the felly of the wheel and is provided on its edge with a seat against which the disc 21 bears adjacent the outer edge of the latter. The part of the disc 21 which bears against the seat of the web 29 and said seat itself lie in a plane parallel to the central plane of the wheel. The edge of the discs 21 is provided with a flange 32 similar to the flange 28 and with apertures adapted to aline with threaded sockets in the felly. Studs 33 extend through the apertures of the disc 21 and engage the threaded sockets of the disc 20 to secure the discs 20 and 21 together. The flanges 28 and 32 are designed to grip the bead of a solid or other tire 34 therebetween.

To afford resiliency and elasticity of movement, the wheel is provided with circular rows of springs 35, 36 and 37, arranged between the respective seats and plugs hereinbefore described. The springs 35 and 36 are arranged symmetrically in circular rows on both sides of the plane of the row of springs 37. An annular plate 38 bridges the space between the flanges 12 and 22, and a cap 39 is secured to the flange 23. The axle 40 which carries the wheel extends through the aperture in the annular plate 38 and the hub of the wheel. A nut 41, is mounted on the outer end of the axle and bears against the flange 13 to secure the wheel to the axle. The disc 38 and the cap 39 are secured in place by suitable means such as studs 42.

From the foregoing description it will be clear that the present invention provides a wheel upon which a solid tire may be mounted and which at the same time will afford the resiliency of a wheel having a pneumatic tire mounted thereon. By the arrangement of the springs 35 and 36 under compression and in two parallel annular rows, a balance is obtained and a resiliency which, in combination with the springs 37, afford a wheel which is durable and at the same time yields to changes of pressure exerted thereupon. The springs and the parts with which they are associated are so constructed as to provide for a slight lateral play, but to prevent excessive play in that direction, the bolts 19 and apertures 18 also allowing for play radially of the wheel between the discs 20 and 21, on the one hand, and the discs 11 and 11$^a$ on the other, so that when the vehicle is started, the inertia of the wheel will be gradually overcome and sudden shock on the parts of the wheel will be avoided. The arrangement is also such as to fully protect the mechanism of the wheel from dirt and injury and to conceal said mechanism from view. The construction also affords means whereby the more delicate parts are made accessible for repair or replacement.

Having described my invention, what I claim as new is:

1. A wheel of the character described having inner and outer pairs of discs arranged to flare toward the hub and having annular flanges at their inner edges, and springs arranged between said flanges.

2. A wheel of the character described having inner and outer pairs of discs arranged to flare toward the hub and having annular flanges at their inner edges, and springs arranged between said flanges, the inner discs having apertures therein and the outer discs being connected by bolts extending through said apertures and of smaller diameter than said apertures.

3. A disc wheel of the character described comprising a hub, a pair of discs mounted on said hub and converging toward their outer edges, a second pair of discs also converging toward their outer edges slidably arranged relatively to said first named pair of discs and having annular flanges spaced from said hub, and springs between said hub and flanges.

4. A disc wheel of the character described comprising a hub, a pair of discs mounted on said hub and converging toward their outer edges, a second pair of discs also converging toward their outer edges slidably arranged relatively to said first named pair of discs and having annular flanges spaced from said hub, springs between said hub and flanges, a cap attached to the outer of said flanges and an apertured disc to the inner of said flanges.

5. A wheel of the character described comprising a hub, discs secured to said hub converging toward their outer edges, said discs being provided at their outer edges with a uniting web having seats therein, a pair of discs also converging toward their outer edges and slidably mounted relatively to the first named discs and having at their outer edges a uniting web constituting the felly of the wheel and annular flanges on their inner edges, springs between said webs, and springs between said hub and said flanges.

6. A wheel of the character described comprising a hub, discs secured to said hub converging toward their outer edges, said discs being provided at their outer edges with a uniting web having seats therein, a pair of discs also converging toward their outer edges and slidably mounted relatively to the first named discs, said last named discs having at their outer edges a uniting web constituting the felly of the wheel and annular flanges on their inner edges, springs between said webs, and springs between said hub and said flanges, said last named springs being arranged in annular rows symmetrically with relation to the first named springs.

7. A wheel of the character described comprising a hub, discs secured to said hub converging toward their outer edges, said discs being provided at their outer edges with a uniting web having seats therein, a pair of discs also converging toward their outer edges and slidably mounted relatively to the first named discs, said last named discs having at their outer edges a uniting web constituting the felly of the wheel and annular flanges on their inner edges, springs between said webs, and springs between said hub and said flanges, said last named springs being arranged in annular rows symmetrically with relation to the first named springs, said flanges and said felly having apertures in alignment with the springs associated therewith, and plugs threaded into said apertures.

8. A wheel of the character described comprising a hub, a pair of discs converging toward their outer edges and having outwardly extending annular flanges affording an aperture to receive said hub, a second pair of discs converging toward their outer edges and slidably mounted within said first named discs, said second pair of discs having a web between their outer edges and each having an annular flange complemental to and lying in spaced relation to the flange of one of said first named discs, the flanges of said second pair of discs having seats, springs between the complemental flanges of said pairs of discs, each of said springs having one of its ends resting in one of said seats, a cap covering the aperture of the flange of one of said first named discs, an annular plate secured to the flange of the other of said first named discs, said discs each having a series of circularly arranged aligning apertures, the apertures of one of said pairs of discs being smaller than those of the other pair of discs, bolts extending through both sets of apertures and closely fitting said smaller sets of apertures, a felly on said first-named discs having flanges adapted to grip a tire mounted thereon, and springs between said felly and the web of said second pair of discs.

In testimony whereof I have hereunto set my hand.

ROBERT ANSON LITTLE.